Nov. 12, 1963   M. DE GROOTE ETAL   3,110,737
CERTAIN OXYALKYLATED POLYOLS
Filed Sept. 15, 1958
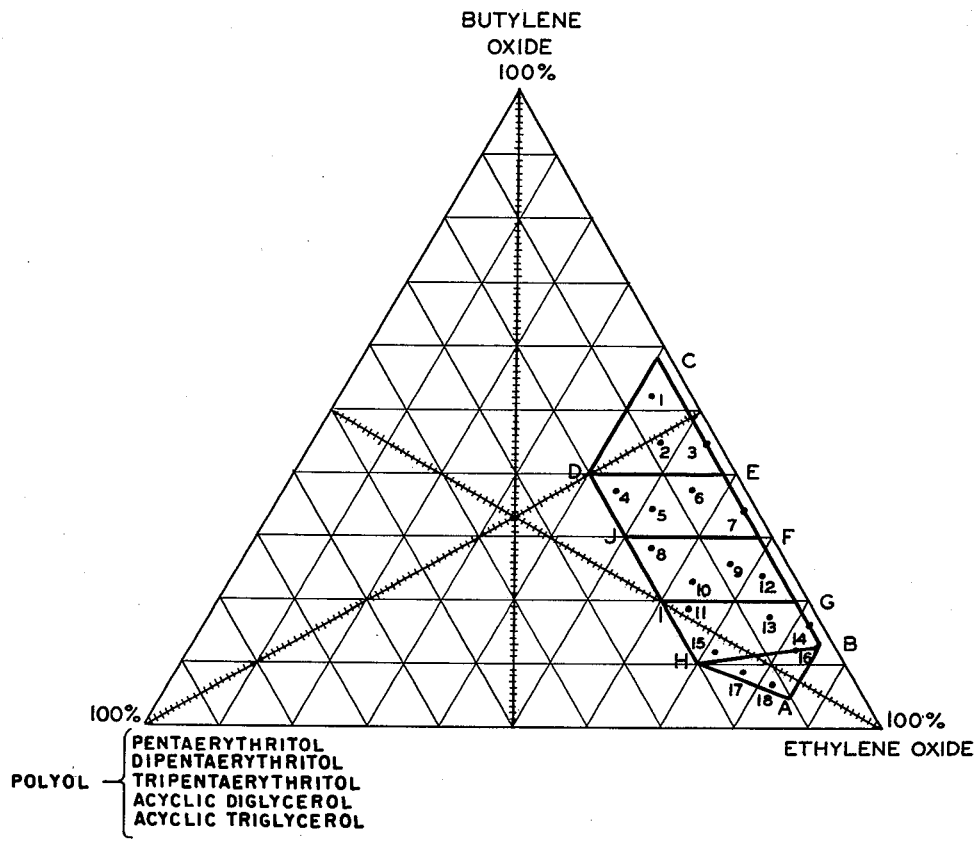
Melvin De Groote
Owen H. Pettingill
INVENTORS
BY
Adams, Forward and McLean
ATTORNEYS United States Patent Office 3,110,737
Patented Nov. 12, 1963

3,110,737
CERTAIN OXYALKYLATED POLYOLS
Melvin De Groote, St. Louis, and Owen H. Pettingill, Kirkwood, Mo., assignors to Petrolite Corporation, Wilmington, Del., a corporation of Delaware
Filed Sept. 15, 1958, Ser. No. 761,038
1 Claim. (Cl. 260—615)

This application is a continuation-in-part of our co-pending applications Serial Nos. 648,735 and 648,737, filed March 26, 1957, and Serial No. 651,847, filed April 10, 1957, and Serial No. 653,443, filed April 17, 1957, and now all abandoned. These four co-pending applications are divisions respectively of Serial Nos. 435,663, and now U.S. Patent No. 2,944,982 and 435,665 and now abandoned, filed June 10, 1954, and 431,783 and 431,785, filed May 24, 1954, the latter two applications having now issued as U.S. Patents 2,819,216 and 2,819,218 respectively.

Our invention is concerned with new chemical products or compounds useful as demulsifying agents in processes or procedures particularly adapted for preventing, breaking or resolving emulsions of the water-in-oil type and particularly petroleum emulsions. Our invention is also concerned with the application of such chemical products or compounds in various other arts and industries as well as with methods of manufacturing the new chemical products or compounds which are of outstanding value in demulsification.

More specifically, the present invention is concerned with a cogeneric mixture of a homologous series of glycol ethers of a polyol selected from the class consisting of pentaerythritol, and dipentaerythritol, tripentaerythritol, acyclic diglycerol.

The new products herein described are derived exclusively from one of the above polyols, ethylene oxide, and butylene oxide, in such weight proportions so the average composition of said cogeneric mixture stated in terms of initial reactants lies approximately within the 5-sided figure of the accompanying drawing in which the minimum polyol content is at least 1.5% and which 5-sided figure is identified by the fact that its area lies within the straight lines connecting A, B, C, D, and H.

We have found that when one of the above polyols is combined with butylene oxide and ethylene oxide in certain proportions and particularly when the butylene oxide is employed first followed by use of ethylene oxide and more especially if the butylene oxide employed is one of the straight chain isomers

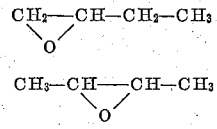

or a mixture of the two and if the composition falls within the limits indicated by the 5-sided figure on the hereto attached triangular chart, said derivatives are of unusual effectiveness for a number of purposes particularly when surface activity is a factor, either directly or indirectly. One example is the use of such derivatives in the resolution of petroleum emulsions of the water-in-oil type.

In a general way the compounds which have been found most effective and fall within the limits of the chart are combinations where one part of polyol has been treated with about 11 to 39 parts of butylene oxide, by weight, and then reacted with 27 to 58.5 parts of ethylene oxide.

It is of interest to note in some instances as little as 1.5 parts of polyol may be combined with 98.5 parts of the two oxides to produce very valuable derivatives.

We have also found that where part of the butylene oxide is replaced by propylene oxide, i.e., where a combination of one of the above polyols, butylene oxide, propylene oxide and ethylene oxide are used, effective and valuable surface-active agents can also be obtained. This, however, represents a separate invention and is the subject matter of co-pending application Serial No. 760,995, filed of even date herewith.

The products of the present invention are also useful for various purposes other than the resolution of petroleum emulsions of the water-in-oil type.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents as, for example, for cosmetics, spray oils, water-repellent textile finishes; as lubricants, etc.

For the purpose of resolving petroleum emulsions of the water-in-oil type and also for that matter for numerous other purposes where surface-active materials are effective, and particularly for those uses specified elsewhere herein, we prefer to employ oxyalkylated derivatives, which are obtained by the use of monoepoxides, in such manner that the derivatives so obtained have sufficient hydrophile character to meet at least the test set forth in U.S. Patent No. 2,499,368, dated March 7, 1950, to De Groote and Keiser. In said patent such test for emulsification using a water-insoluble solvent, generally xylene, is described as an index of surface activity.

The above mentioned test, i.e., a conventional emulsification test, simply means that the preferred product for demulsification is soluble in a solvent having hydrophobe properties or in an oxygenated water insoluble or even a fraction of a water-soluble hydrocarbon solvent and that when shaken with water the product may remain in the nonaqueous solvent or, for that matter, it may pass into the aqueous solvent. In other words, although it is xylene soluble, for example, it may also be water soluble to an equal or greater degree.

For purpose of convenience what is said hereinafter will be divided into four parts.

Part 1 is concerned with the oxyalkylation of the polyol in general;

Part 2 is concerned with the oxyalkylation of the polyol using two different oxides, i.e., butylene oxide and ethylene oxide so as to produce derivatives falling within certain composition limitations hereinafter noted in detail. For convenience, Part 2 is divided into two sections. Section A is concerned with oxybutylation and oxyethylation broadly, and Section B is connected with the particular compositions corresponding to the herein specified compositions and illustrate such combinations;

Part 3 is concerned with the resolution of petroleum emulsions of the water-in-oil type by means of the previously described chemical compounds; and Part 4 is concerned with uses for the products herein described either as such or after modification, including applications other than those involving the resolution of petroleum emulsions of the water-in-oil type.

PART 1

At the present time there is available butylene oxide which includes isomeric mixtures; for instance, one manufacturer has previously supplied a mixed butylene oxide which is in essence a mixture of 1-butene oxide, 2-butene oxide isomers and approximately 10% isobutylene oxide. Another manufacturer has supplied an oxide which is roughly a fifty-fifty mixture of the cis- and trans-isomers of 2-butene oxide.

There is also available a butylene oxide which is characterized as straight chain isomers being a mixture of the 1,2 and 2,3 isomers and substantially free from the isobutylene oxide.

This latter product appears to consist of 80% of the 1,2 isomer and 15% of the mixed 2,3 cis- and 2,3-trans-isomer. We have obtained the best results by using an oxide that is roughly 80% or more of the 1,2 isomer and with either none, or just a few percent if any, of the isobutylene oxide, the difference being either form of the 2,3 or a mixture of the two forms.

Our preference is to use an oxide substantially free from the isobutylene oxide, or at least having minimum amounts of isobutylene oxide present.

In the present invention we have found that outstanding products are obtained by the use of certain preferred butylene oxides, i.e., those entirely free or substantially free (usually 1% or less) and composed of approximately 85% or more of the 1,2 isomer with the remainder, if any, being the 2,3 isomer.

Reference to butylene oxide herein of course is to the compound or compounds having the oxirane ring and thus excludes 1,4-butylene oxide (tetrahydrofurane) or a trimethylene ring compound.

When reference is made to the oxides, for instance, ethylene oxide and butylene oxide, one can use the corresponding carbonates. Ethylene carbonate is available commercially. Butylene carbonate, or the carbonate corresponding to a particular oxide, is not available commercially but can be prepared by the usual methods in the laboratory. For this reason it is understood when oxyethylation takes place by means of ethylene carbonate one could, of course, use butylene carbonate for oxybutylation.

PART 2

Section A

We have found that we can oxybutylate pentaerythritol, dipentaerythritol, tripentaerythritol, or acyclic diglycerol in the same manner that they are conventionally subjected to oxypropylation. For example, we have followed the directions which appear in columns 11 and 12 of U.S. Patent No. 2,626,907 dated January 27, 1953, to De Groote, in regard to the oxypropylation of dipentaerythritol, substituting butylene oxide for propylene oxide, and continuing the operation in identically the same way. We completed the reaction with the same conditions set forth in Examples 1a through 5a, inclusive. Sitrrer speed, temperature, time period, amount of solvent used, amount of catalyst used, and operating pressure were substantially the same.

Numerous other patents include specific information as to the oxypropylation of pentaerythritol and pentaerythritol polymers. Actually the procedure is substantially the same whether one uses butylene oxide, propylene oxide or ethylene oxide.

To illustrate such well known precedure the following examples are included.

Example 1a

The reaction vessel employed was a stainless steel autoclave with the usual devices for heating, heat control, stirrer, inlet, outlet, etc. which is conventional in this type of apparatus. The capacity was approximately 4 liters. The stirrer operated at a speed of approximately 250 r.p.m.

There were charged into the autoclave 500 grams of pentaerythritol, 300 grams of xylene, and 15 grams of sodium methylate. The autoclave was sealed, swept with nitrogen gas and stirring started immediately and heat applied. The temperature was allowed to rise to approximately 145° C. At this particular time the addition of butylene oxide was started. The butylene oxide employed was a mixture of the straight chain isomers substantially free from isobutylene oxide (roughly 85% of the 1,2 isomer and approximately 15% of the 2,3-cis- and the 2,3-trans-isomer). It was added continuously at such speed that it was absorbed by the reaction as added. The amount added in this operation was 1500 grams. The time required to add the butylene oxide was 2 hours. During this period the temperature was maintained at 128° C. to 145° C. using cooling water through the inner coils when necessary and otherwise applying heat if required. the maximum pressure during the reaction was 48 pounds per square inch.

Ignoring the xylene and sodium methylate and considering only the pentaerythritol for convenience, the resultant product represents 3 parts by weight of butylene oxide to one part by weight of pentaerythritol. The xylene present represented 0.6 of one part by weight.

Example 2a

The reaction mass was transferred to a larger autoclave (capacity 15 liters). Without adding any more solvent or any more xylene the procedure was repeated so as to add another 1500 grams of butylene oxide under substantially the same operating conditions but requiring about 3 hours for the addition. At the end of this step the ratio represented approximately 6 to 1 (ratio butylene oxide to pentaerythritol.)

Example 3a

In a third step, instead of adding 1500 grams of butylene oxide, 1625 grams were added. The reaction slowed up and required approximately 5.75 hours, using the same operating temperatures and pressures. The ratio at the end of the third step was 9.25 parts by weight of butylene oxide per weight of pentaerythritol.

Example 4a

At the end of the third step the autoclave was opened and an additional 5 grams of sodium methylate added, the autoclave flushed out as before, and the fourth and final oxyalkylation was completed by addition of 1625 grams of butylene oxide and the oxyalkylation was complete within 3 hours using the same temperature range and pressure as previously. At the end of the reaction the product represented approximately 12.5 parts of butylene oxide by weight to one part of pentaerythritol.

Additional runs were made with dipentaerythritol, tripentaerythritol, and acyclic diglycerol employing the same reaction procedure, equipment and reactant amounts as described in Examples 1a through 4a. The pertinent data with respect to reaction conditions appear below.

|  | Reaction Temperature,° C | Maximum Pressure | Time required to Add BuO | | | |
|---|---|---|---|---|---|---|
|  |  |  | First Step | Second Step | Third Step | Fourth Step |
| Dipentaerythritol | 130-148 | 55 | 2 | 4 | 6.75 | 4.5 |
| Tripentaerythritol | 132-145 | 48 | 2 | 3.75 | 6 | 3.75 |
| Diglycerol | 130-145 | 47 | 1.75 | 2.75 | 5.75 | 3 |
| Triglycerol | 133-146 | 48 | 1.67 | 3.25 | 5.5 | 3.33 |

All the products of the examples, except those of the first step, were substantially water-insoluble and xylene-soluble.

PART 2

Section B

In light of what has been said previously, particularly in Section A, it is obvious that hardly any directions are required to produce the compounds herein specified. However, referring to the proportions of the initial reactants based on the 5-sided figure in the attached drawing, it will be noted we have calculated the percentage of the three initial reactants for the points A, B, C, D, E, F, G, H, I and J which appear on the boundary of the 5-sided figure and also determine the five sub-divided parts of the 5-sided figure, two parts being triangles and the others being two parallelograms, and one trapezoid. Likewise we have calculated the composition for a number of examples within the area of the graph and corresponding to points 1 to 18, inclusive. Note these data are included in Table I, immediately following:

TABLE I

| Points on Boundary of Area | Tertiary Mixture Percent Basis | | | Binary Intermediate Mixtures Percent Basis | | | |
|---|---|---|---|---|---|---|---|
| | Polyol | Butylene Oxide | Ethylene Oxide | Polyol | Butylene Oxide | Polyol | Ethylene Oxide |
| A | 10.0 | 5.0 | 85.0 | 66.6 | 33.4 | 10.5 | 89.5 |
| B | 1.5 | 13.5 | 85.0 | 10.0 | 90.0 | 1.7 | 98.3 |
| C | 1.5 | 58.5 | 40.0 | 2.5 | 97.5 | 3.6 | 96.4 |
| D | 20.0 | 40.0 | 40.0 | 33.4 | 66.6 | 33.4 | 66.6 |
| E | 1.5 | 40.0 | 58.5 | 3.6 | 96.4 | 2.5 | 97.5 |
| F | 1.5 | 30.0 | 68.5 | 4.75 | 95.25 | 2.14 | 97.86 |
| G | 1.5 | 20.0 | 78.5 | 7.0 | 93.0 | 1.87 | 98.13 |
| H | 20.0 | 10.0 | 70.0 | 66.6 | 33.4 | 22.2 | 77.8 |
| I | 20.0 | 20.0 | 60.0 | 50.0 | 50.0 | 25.0 | 75.0 |
| J | 20.0 | 30.0 | 50.0 | 40.0 | 60.0 | 28.6 | 71.4 |
| 1 | 5.0 | 52.5 | 42.5 | 8.68 | 91.32 | 10.5 | 89.5 |
| 2 | 8.0 | 44.0 | 48.0 | 15.4 | 84.5 | 14.3 | 85.7 |
| 3 | 1.5 | 54.5 | 44.0 | 2.68 | 97.32 | 3.3 | 96.7 |
| 4 | 18.0 | 36.5 | 45.5 | 33.0 | 67.0 | 28.3 | 71.7 |
| 5 | 15.0 | 33.5 | 51.5 | 31.0 | 69.0 | 22.6 | 77.4 |
| 6 | 7.5 | 36.5 | 56.0 | 17.1 | 82.9 | 11.8 | 88.2 |
| 7 | 1.5 | 34.5 | 64.0 | 4.16 | 95.84 | 2.3 | 97.7 |
| 8 | 17.0 | 28.0 | 55.0 | 37.7 | 62.3 | 23.6 | 76.4 |
| 9 | 7.0 | 26.0 | 67.0 | 21.2 | 78.8 | 9.5 | 90.5 |
| 10 | 13.5 | 22.5 | 64.0 | 37.5 | 62.5 | 17.4 | 82.6 |
| 11 | 15.5 | 19.0 | 65.5 | 44.8 | 55.2 | 19.2 | 80.8 |
| 12 | 4.5 | 23.0 | 72.5 | 16.35 | 83.65 | 5.85 | 94.15 |
| 13 | 6.0 | 17.0 | 77.0 | 26.1 | 73.9 | 7.2 | 92.8 |
| 14 | 1.5 | 17.0 | 81.5 | 8.1 | 91.9 | 1.8 | 98.2 |
| 15 | 16.0 | 12.5 | 71.5 | 56.2 | 43.8 | 18.3 | 81.7 |
| 16 | 4.5 | 13.0 | 82.5 | 25.7 | 74.3 | 5.2 | 94.8 |
| 17 | 13.5 | 9.0 | 77.5 | 60.0 | 40.0 | 14.8 | 85.2 |
| 18 | 11.5 | 7.0 | 81.5 | 62.1 | 37.9 | 12.35 | 87.65 |

Note the first column gives the particular point on the boundary of the 5-sided figure or within the 5-sided figure area. Note the next three columns represent the tertiary mixture which correspond to the initial reactants, to wit, the percentages, by weight, of polyol, butylene oxide and ethylene oxide. Thus it is apparent that one could select any particular point and simply use the appropriate number of pounds of oxide; for instance, in regard to point A all that would be necessary would be to mix 5 pounds of butylene oxide with 85 pounds of ethylene oxide and use the mixture to oxyalkylate 10 pounds of the appropriate polyol.

Similarly, in point B, one need only mix 13.5 pounds of butylene oxide with 85 pounds of ethylene oxide and use the mixture to oxyalkylate 1.5 pounds of the appropriate polyol.

Note the fifth and sixth columns represent binary intermediate mixtures. For instance, in regard to the various points on the boundary and within the 5-sided figure area, we have calculated the initial mixture using the polyol and butylene oxide in the first case, and using the polyol and ethylene oxide in the second case, which would be employed for subsequent oxyalkylation to give the particular composition required. Note that a binary intermediate for the preparation of point A can be prepared in any suitable manner involving 66.6% of the appropriate polyol and 33.4% of butylene oxide. Thus, for example, one could use 66.6 pounds of pentaerythritol and 33.4 pounds of butylene oxide, or on a larger scale one could use 666 pounds of pentaerythritol and 334 pounds of butylene oxide.

Referring now to the tertiary mixture table, it is apparent that for point A the pentaerythritol and butylene oxide together represent 15%, and ethylene oxide 85%. Therefore, one could employ 15 pounds of the binary mixture and react it with 85 pounds of ethylene oxide.

Referring now to columns 7 and 8, it is obvious one could readily produce an oxyethylated polyol and then subject it to reaction with butylene oxide. Using this procedure in regard to point A, it is obvious that the mixture represents 10.5% of polyol and 89.5% of ethylene oxide. This product could be obtained from a binary mixture of 105 pounds of pentaerythritol and 895 pounds of ethylene oxide.

Referring now to the tertiary mixture table, it is obvious that 95 pounds of such mixture could be reacted with 5 pounds of butylene oxide to give point A. Similarly, in regard to point B the oxyethylated pentaerythritol represents 1.7% of pentaerythritol and 98.3% ethylene oxide. The mixture so obtained by referring to the tertiary mixture table would be reacted with butylene oxide in the proportion of 86.5% pounds of the mixture and 13.5 pounds of butylene oxide.

As previously pointed out, the oxyalkylation of an initially oxyalkylated polyol such as pentaerythritol has been described in the literature and is described also in detail above. All one need do is employ such conventional oxyalkylation procedure to obtain products corresponding to the compositions as defined. Attention is directed to the fact that one need not add the entire amount of either oxide at one time but that a small portion of one could be added and then another small portion of the other, and the process repeated.

Purely for purpose of illustration, we have prepared examples three different ways corresponding to the compositions shown on the chart for each of pentaerythritol, dipentaerythritol, tripentaerythritol, acyclic diglycerol, and acyclic triglycerol. In the first series the butylene oxides and ethylene oxide were mixed; this series is indicated as Aa, Ba, through and including 18a; in the second series butylene oxide was used first followed by ethylene oxide and this series indicated Ab, Bb, through and including 18b; and finally in the third series ethylene oxide was used followed by butylene oxide and the series identified as Ac, Bc, through and including 18c.

TABLE II

| Composition Corresponding to Following Point | Composition where Oxides are Mixed Prior to Oxyalkylation | Composition where Butylene Oxide Used First Followed by Ethylene Oxide | Composition where Ethylene Oxide Used First Followed by Butylene Oxide |
|---|---|---|---|
| A | Aa | Ab | Ac |
| B | Ba | Bb | Bc |
| C | Ca | Cb | Cc |
| D | Da | Db | Dc |
| E | Ea | Eb | Ec |
| F | Fa | Fb | Fc |
| G | Ga | Gb | Gc |
| H | Ha | Hb | Hc |
| I | Ia | Ib | Ic |
| J | Ja | Jb | Jc |
| 1 | 1a | 1b | 1c |
| 2 | 2a | 2b | 2c |
| 3 | 3a | 3b | 3c |
| 4 | 4a | 4b | 4c |
| 5 | 5a | 5b | 5c |
| 6 | 6a | 6b | 6c |
| 7 | 7a | 7b | 7c |
| 8 | 8a | 8b | 8c |
| 9 | 9a | 9b | 9c |
| 10 | 10a | 10b | 10c |
| 11 | 11a | 11b | 11c |
| 12 | 12a | 12b | 12c |
| 13 | 13a | 13b | 13c |
| 14 | 14a | 14b | 14c |
| 15 | 15a | 15b | 15c |
| 16 | 16a | 16b | 16c |
| 17 | 17a | 17b | 17c |
| 18 | 18a | 18b | 18c |

The products obtained by the above procedure usually show some color varying from reddish amber to reddish black. They can be bleached in the usual fashion using bleaching clays, charcoal, or an organic bleach, such as peroxide or peracetic acid, or the like.

Such products also have present a small amount of alkaline catalyst which can be removed by conventional means or they can be neutralized by adding an equivalent amount of acid, such as hydrochloric acid. For many purposes the slight amount of residual alkalinity is not objectionable.

The preference is to use the type of material obtained by reacting first with butylene oxide and then with ethylene oxide.

In the hereto appended claims reference has been made to "glycol ethers" of polyols. Actually it well may be that the products should be referred to as "polyol ethers" in order to emphasize the fact that the final products of reaction have more than two hydroxyl radicals. However, the products may be considered as hypothetically derived by reaction of the appropriate polyol with the glycols, such as ethylene glycol or butylene glycol or the corresponding polyglycols. For this reason there seems to be a preference to use the terminology "glycol ethers" rather than "polyol ethers."

PART 3

As to the use of conventional demulsifying agents, reference is made to U.S. Patent No. 2,626,929, dated January 27, 1953, to De Groote, and particularly to Part 3. Everything that appears therein applies with equal force and effect to the instant process, noting only that where reference is made to Example 13b in said text beginning in column 15 and ending in column 18, reference is made to the product obtained by reacting 7.5 parts of the appropriate polyol with 36.5 parts of butylene oxide, followed by 56.0 parts of ethylene oxide.

PART 4

The compounds derived in the manner described may be used as such for breaking petroleum emulsions of the water-in-oil type. They also can be converted into derivatives of the kind subsequently described which also may be used for this same purpose. Such derivatives are useful for other purposes including the same purposes for which the herein described products are effective such as where detergents, common solvents, emulsifiers, and the like are used. They may be used as lubricants and as additives to fluids used in hydraulic brake systems; they may be used as emulsifying agents to emulsify or remove greases or dirt; they may be used in the manufacture of a variety of other materials such as soluble oils, insecticide sprays, etc.

These products may be combined with a variety of reactants as chemical intermediates, for instance, with various diepoxides or polyepoxides. They may be combined with a number of other monoepoxides, such as epichlorohydrin, styrene oxide, glycide and methylglycide. They may be reacted with alkyl glycidyl ether, glycidyl isopropyl ether, and glycidyl phenyl ether.

Furthermore, such products may be reacted with alkylene imines, such as ethylene imine or propylene imine to produce cation-active materials.

The products may be combined with carboxy acids such as higher fatty acids so as to change their characteristics or with polycarboxy acids, such as diglycolic, maleic acid, phthalic acid, sucinic acid, and the like, to give resins, soft polymers, or fractional esters which are essentially monomeric. Such products and others herein described, may all be used for the resolution of petroleum emulsions of the water-in-oil type. The products without further reaction are particularly valuable as additives for lubricating oils which are derived from sources other than petroleum.

The herein described products and the derivatives thereof are particularly valuable in flooding processes for recovery of oil from subterranean oil-bearing strata when employed in the manner described in U.S. Patent No. 2,233,381, dated February 25, 1941, to De Groote and Keiser.

Having thus described our invention, what we claim as new and desire to secure by Letters Patent is:

A cogeneric mixture of a homologous series of glycol ethers of acyclic diglycerol; said cogeneric mixture being derived exclusively from acyclic diglycerol reacted successively with butylene oxide and ethylene oxide under oxyalkylation conditions in such weight proportions so the average composition of said cogeneric mixture, stated in terms of initial reactants, lies approximately within the 5-sided figure of the accompanying drawing in which the minimum acyclic diglycerol content is at least 1.5% and which 5-sided figure is identified by the fact that its area lies within the straight lines connecting A, B, C, D, and H.

References Cited in the file of this patent

UNITED STATES PATENTS

| | | |
|---|---|---|
| 2,174,761 | Schuette et al. | Oct. 3, 1939 |
| 2,552,528 | De Groote | May 15, 1951 |
| 2,552,529 | De Groote | May 15, 1951 |
| 2,674,619 | Lundsted | Apr. 6, 1954 |
| 2,677,700 | Jackson et al. | May 4, 1954 |
| 2,839,476 | De Groote et al. | June 17, 1958 |
| 2,839,477 | De Groote et al. | June 17, 1958 |